United States Patent [19]

Gouvenot

[11] Patent Number: 4,615,643

[45] Date of Patent: Oct. 7, 1986

[54] METHOD OF SEALING OFF A MASS OF WASTE STOCK CONTAINING METAL CATIONS

[75] Inventor: Daniel Gouvenot, Clichy, France

[73] Assignee: Soletanche, Nanterre, France

[21] Appl. No.: 758,197

[22] Filed: Jul. 24, 1985

[30] Foreign Application Priority Data

Jul. 26, 1984 [FR] France ................................ 84 11863

[51] Int. Cl.$^4$ .......................... E02D 3/12; E02D 3/14
[52] U.S. Cl. ...................................... 405/128; 106/74;
106/900; 166/293; 252/8.551; 252/633;
405/263; 405/267
[58] Field of Search ............... 405/263, 264, 128, 129,
405/266, 267; 166/292, 294, 295, 293; 106/74,
84, 900; 252/8.55 R, 628, 633

[56] References Cited

U.S. PATENT DOCUMENTS

| | | | |
|---|---|---|---|
| 3,071,481 | 1/1963 | Beach et al. | 166/293 X |
| 3,565,533 | 2/1971 | Garcia et al. | 166/293 X |
| 3,835,926 | 9/1974 | Clement | 106/76 X |
| 3,969,902 | 7/1976 | Ichise et al. | 405/267 |
| 3,990,903 | 11/1976 | Mallow | 166/292 X |
| 4,004,428 | 1/1977 | Tazawa et al. | 106/74 X |
| 4,018,616 | 4/1977 | Sugahara et al. | 106/74 |
| 4,430,256 | 2/1984 | Rustum | 405/128 X |
| 4,452,635 | 6/1984 | Noshi et al. | 106/74 |
| 4,565,577 | 1/1986 | Burkhardt et al. | 106/900 X |

*Primary Examiner*—Dennis L. Taylor

[57] ABSTRACT

A method for sealing a mass of stored waste containing cations comprises insulating the waste mass with at least one grout barrier which retains heavy metallic cations. The grout barrier is established by filling the hollows in the soil or fissured rocks with a grout containing specified amounts of cement, clay, siliceous products, sodium carbonate and alkali-metal tartarate.

8 Claims, No Drawings

METHOD OF SEALING OFF A MASS OF WASTE STOCK CONTAINING METAL CATIONS

The object of the present invention is a method of sealing off a mass of stored waste containing cations.

The present invention is intended in particular to provide a method involving a special sealing grout that makes it possible to prevent or impede the migration of metal cations into the environment.

The grout employed in the method makes it possible in particular to establish a hydraulic barrier with properties that retain heavy metallic cations contained in soils with various characteristics.

Protection against industrial wastes assumes considerable significance from the aspect of contamination of the environment as well as of avoiding the hazards of toxicity, which are sometimes particularly serious with respect to populations established in the vicinity of waste-storage sites.

At the present time, industrial wastes, aside from radioactive wastes, which require especially strict and carefully monitored measures, are stored by establishing a hydraulic barrier at the periphery of the stock in order to provide a protective grouting curtain between the waste and the environment.

This type of curtain, however, often does not make it possible to block off the migration of certain especially toxic heavy metallic cations like those of lead or mercury.

It is also recommended in this type of installation to maintain a level of water inside the curtain that is lower than that of the natural sheet, so that flow will occur from the environment toward the stored waste in case the grouting curtain cracks.

This means that the stored wastes must be regularly monitored to ensure a satisfactory water level and hence to prevent any significant escape consequent to cracks in the grouting curtain.

In the fields of radioactive-waste storage, European Pat. No. 0 081 403 proposes a method involving special injection grouts that contain
40 to 400 parts by weight of cement,
80 to 1000 parts by weight of a clay selected from the group montmorillonite, illite, and vermiculite,
25 to 1200 parts by weight of diatomaceous earth and/or natural or artificial pozzolans.

This composition provides the grout with all the properties necessary to establish a barrier that is particularly effective with respect to radioactive ions.

By its very composition nevertheless, this grout does not make it possible to prevent the migration of toxic heavy cations such as those of lead and/or mercury.

The special sealing grout in the method in accordance with the invention on the other hand includes certain additives that enables it to improve or correct the conditions in which industrial wastes are stored while ensuring satisfactory protection of the environment. The additives actually cause the formation of insoluble or very slightly soluble compounds that are not entrained but, on the contrary precipitate and stop or clog up the pores or micropores in the concrete, improving not only its compactness but also its tightness.

The grout on the basis of these additives accordingly makes it possible to establish a grouting curtain with the two simultaneous properties of being impermeable to water and of retaining the metal cations, a curtain that can be obtained by impregnating the soil by injection to fill up hollows or fissured rock and that is chemically active in relation to metal cations.

The additives to the grout act in two different ways in relation to metal cations, first by creating insoluble compounds, which helps to decrease the concentration of ions within the mass of stored waste and increase the content of ions in the solid phase, and then by adsorption, the insoluble compounds being fixed as they advance within the curtain by certain constituents of the grout, especially silicas with an extensive specific surface.

Furthermore, as already mentioned, the resulting insoluble compounds increase tightness by stopping or clogging up the pores and micropores in the concrete.

The object of the present invention is accordingly a method of sealing off a mass of waste stored in the soil that consists of insulating the mass by establishing at least one grouting barrier or curtain that retains heavy metallic cations and that is obtained by filling up hollows in the soil or fissured rock within the soil surrounding the mass with, or injecting into them, a grout containing
60 to 500 parts by weight of cement,
25 to 500 parts by weight of clay, and
0 to 800 parts by weight of a natural or artificial siliceous product,
per 1000 parts by weight of water, characterized in that the grout that is injected also contains a mixture of
2 to 6 parts by weight of sodium carbonate and
0.5 to 20 parts by weight of an alkali-metal pyrophosphate and/or alkali-metal tartrate
to retain the heavy metallic cations.

The presence in the grout of both sodium carbonate and of an alkali-metal pyrophosphate and/or alkali-metal tartrate will, through a chemical reaction with the heavy metallic cations, form salts that are insoluble or very slightly soluble in water.

In one preferred embodiment of the invention the alkali-metal pyrophosphate is sodium pyrophosphate and the alkali-metal tartrate is potassium tartrate.

When the grout for carrying out the method in accordance with the invention contains a mixture of sodium pyrophosphate and potassium tartrate, the mixture is present in a proportion of 3 to 15 parts by weight and the ratio of pyrophosphate to tartrate generally ranges from 3:1 to 15:1 and preferably from 5:1 to 10:1.

The grout in accordance with the invention is particularly intended to retain certain especially toxic metal cations, specifically of lead ($Pb^{2+}$) and of mercury ($Hg^+$ and $hg^{2+}$).

The insoluble salts form due to the reaction of the metal cations with the sodium carbonate on the one and with the sodium pyrophosphate and/or potassium tartrate on the other.

With respect to lead in particular the insoluble compounds are simultaneously formed by means of sodium carbonate and of acid sodium pyrophosphate in accordance with the reaction formulae

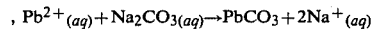
$$Pb^{2+}_{(aq)} + Na_2CO_{3(aq)} \rightarrow PbCO_3 + 2Na^+_{(aq)}$$

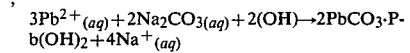
$$3Pb^{2+}_{(aq)} + 2Na_2CO_{3(aq)} + 2(OH) \rightarrow 2PbCO_3 \cdot Pb(OH)_2 + 4Na^+_{(aq)}$$

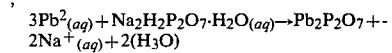
$$3Pb^{2}_{(aq)} + Na_2H_2P_2O_7 \cdot H_2O_{(aq)} \rightarrow Pb_2P_2O_7 + 2Na^+_{(aq)} + 2(H_3O)$$

$$2Pb_{2(aq)} + Na_2H_2P_2O_7 \cdot H_2O_{(aq)} \rightarrow Pb_2P_2O_7 \cdot H_2O + 2Na^+_{(aq)} + 2(H_3O).$$

The resulting compounds are natural cerussite ($PbCO_3$), which has a solubility of $1.1 \times 10^{-4}$ in 100 g of water (about 1 ppm) at 20° C., hydrocerussite ($2PbCO_3 \cdot Pb(OH)_2$), which is insoluble in water, and the lead pyrophosphates ($Pb_2P_2O_7$ and $Pb_2P_2O_7 \cdot H_2O$), which are also insoluble in water.

With respect to mercury ($Hg^{30}$) the insoluble compounds are formed by reaction in the presence of sodium carbonate and of potassium tartrate in accordance with the reaction formulae $$2Hg^+_{(aq)} + Na_2CO_{3(aq)} \rightarrow Hg_2CO_3 + 2Na^+_{(aq)}$$

$$2Hg^+_{(aq)} + K_2C_4H_4O_6 \cdot \tfrac{1}{2}H_2O_{(aq)} \rightarrow Hg_2C_4H_4O_6 = 2K^+_{(aq)} + \tfrac{1}{2}H_2O.$$

Mercurous carbonate ($CO_3Hg_2$) has a solubility of $4.5 \times 10^{-6}$ in 100 g of water (about 0.05 ppm) and mercury tartrate ($Hg_2C_4H_4O_6$) is insoluble in water.

With respect to the $Hg^{2+}$ mercury, the insoluble-salt formation reaction especially involves sodium carbonate in accordance with the reaction formula $$3Hg^{2+} + 2Na_2CO_{3(aq)} \rightarrow HgCO_3 \cdot 2HgO + 6Na^+_{(aq)} + 2CO_2.$$

The resulting mercuric carbonate ($Hg_2CO_3 \cdot 2HgO$) is insoluble in water.

The sodium carbonate present in the composition of the grout not only promotes the formation of insoluble compounds but also plays the part of activating agent for the siliceous product.

The siliceous product in the grout in accordance with the invention is present in a dispersed form, meaning that it has an extensive surface per unit of weight, preferably a specific surface of more than 3000 cm²/g.

The extensive specific surface of the siliceous products employed helps to promote the absorption of the resulting insoluble products as and if they advance within the grouting curtain.

The particular siliceous product employed can be silica in the pure state or preferably products containing at least 80 to 90% by weight of $SiO_2$, especially artificial pozzolans consisting for example of special silicates, fly ash, etc.

Silica in the form of pozzolans makes it possible to fix calcium hydroxide in the presence of water in order to give rise to stable compounds with hydraulic properties. Thus, the lime released during the hydration of bi- and tricalcium silicates in the cement combines slowly with the silica and with the aluminum in the fly ash in the grout to form insoluble calcium silicates and aluminates, helping to reinforce the stability of the crystal structure, the hydraulic properties, and the power to retain the binder.

The addition of silica like the pozzolans also prevents the shrinkage that can occur as the grout solidifies due to the liberation of alkaline compounds, which are adsorbed by the pozzolans.

The cements employed consist essentially of bi- and tricalcium silicates, of tricalcium aluminate, of a ferrite phase, and of gypsum. Different types of cement, like Portland cement and cements containing a certain amount of blast-furnace slag or fly ash, like the cements marketed under the designations CLK (containing at least 80% slag) and CPJ (containing 70 to 80% clinker), can be employed.

The amount of cement can vary between 60 and 650 parts by weight, depending on the mechanical strength that it is desired to provide for the grouting curtain with properties of metal-cation retention.

The clays employed are the natural clays in the group consisting of bentonite, kaolin, montmorillonite, attapulgite, illite, and vermiculite.

Their colloidal properties allow these clays to ensure the stability of the cement suspension.

The sealing grout employed in the method in accordance with the invention can also contain certain adjuvants in order to adapt the rheological parameters of the grout to the nature of the soil. Thus the grout can contain an accelerator like calcium chloride or a setting retardant like sodium lignosulfite in order to modify the viscosity-to-rigidity parameters and obtain optimal rheological properties.

The proportion of these different adjuvants is generally between 5 and 50 parts by weight per 1000 parts by weight of water in accordance with the invention.

The proportions of clay and of cement depend on the nature of the soil that the grout is to be injected into.

For a hardened grout, actually, investigation of the ratio of stress to deformation will indicate three ranges, corresponding to different inflections of the curve:
deformation in the elastic range
deformation in the plastic range, and
flow range.

To ensure that the total will satisfactorily resist crack under lateral confinement the grout must be employed within the range of plastic deformation so that it can deform without cracking. Thus, a curtain established with the grout will exhibit a supplemental resistance factor with respect to natural or artificial paraseismic factors like earthquakes, tidal waves, etc.

The invention also makes it possible to control the levels of the different constituents in the grout to provide it with satisfactory stability.

In order, actually, to be employed in a waste storage project in the soil the grout must be highly stable in order to penetrate deep enough when injected into the fissure in the ground to obtain for example a barrier 10 m thick in order to ensure the life of the storage project.

The grout is injected into the soil with conventional equipment subject to an injection pressure of generally between 5 and 20 bars.

The viscosity of the grout will depend on the nature of the soil that is being treated, and pressure is varied with the intention of filling the hollows or fissures in the soil.

Tables I through III list different types of grout that can be employed for the method in accordance with the invention.

The grouts 1 through 4 in Table I are specifically intended for grouting curtains established by perforating the ground under a self-hardening mud, grouts 1 and 2 being appropriate for ensuring the retention of $Pb^{2+}$ and 3 and 4 for that of $Hg^+$ and $Hg^{2+}$ ions.

The cement employed in these grouts is preferably a cement marketed under the designation CLK 45, the clay montmorillonite, and the siliceous products silica fumes for grouts 2 and 4 and fly ash for grouts 1 and 3.

Grouts 1 and 4 can also have fluidizing agents and/or hardening retardants added to them depending on the nature of the soil to be treated.

The grouts 5 through 12 in Table II are especially intended for treating soils consisting of fissured rocks, grouts 5 through 8 exhibiting properties that retain $Pb^+$ ions and grouts 9 through 12 those that retain $Hg^+$ and $Hg^{2+}$ ions.

CLK cement is employed in grouts 7, 8, 11, and 12, and CPA in grouts 5, 6, 9, and 10. The siliceous product in grouts 5, 7, 9, and 11 is fly ash and that in grouts 6, 8, 10, and 12 silica fumes.

The grouts 13 through 18 in Table III are especially intended for filling large hollows in the soil and make it possible to ensure the retention of both $Pb^+$ and $Hg^+$ and $Hg^{2+}$ ions.

The cement employed in these grouts is marketed under the designation CLK 45 and contains 80% slag, with montmorillonite for the clay, and with fly ash as the siliceous product in grouts 13 and 16, silica fumes in grouts 15 and 18, and a mixture of 90% fly ash and 10% silica fumes in grouts 14 and 17.

As will be evident, grouts 13 through 18 in Table III have much higher levels of dry matter than those in Tables I and II, which makes them particularly appropriate for filling significant hollows, whereas the grouts, especially in Table I, with a low level of dry matter are particularly appropriate for filling millimetric fissures.

Although various tests have confirmed the high effectiveness of curtains intended to retain various cations of toxic heavy metals, especially lead and mercury, the invention is in no way limited to these examples of cations.

The method in accordance with the invention can naturally be employed with grouts containing aggregates like pebbles, sand, etc. to obtain plastic or resistant concretes.

TABLE I

| Constituents | Grouts | | | |
|---|---|---|---|---|
| | 1 | 2 | 3 | 4 |
| Water (liters) | 1000 | 1000 | 1000 | 1000 |
| Clay (kg) | 28 | 30 | 29 | 27 |
| Cement (kg) | 75 | 120 | 85 | 135 |
| Siliceous product (kg) | 55 | 25 | 60 | 30 |
| Sodium carbonate (kg) | 2.5 | 3 | 3.5 | 5 |
| Sodium pyrophosphate (kg) | 3 | 4 | — | — |
| Potassium tartrate (kg) | — | — | 0.65 | 0.8 |

TABLE II

| Constituents | Grouts | | | | | | | |
|---|---|---|---|---|---|---|---|---|
| | 5 | 6 | 7 | 8 | 9 | 10 | 11 | 12 |
| Water (liters) | 1000 | 1000 | 1000 | 1000 | 1000 | 1000 | 1000 | 1000 |
| Clay (kg) | 33 | 35 | 40 | 30 | 32 | 34 | 30 | 37 |
| Cement (kg) | 300 | 300 | 300 | 400 | 300 | 300 | 300 | 400 |
| Siliceous product (kg) | 280 | 40 | 160 | 25 | 380 | 43 | 180 | 28 |
| Sodium carbonate (kg) | 8 | 4 | 7 | 3.8 | 8.5 | 4.2 | 5.5 | 3.5 |
| Sodium pyrophosphate (kg) | 8 | 7 | 8 | 7.2 | — | — | — | — |
| Potassium tartrate (kg) | — | — | — | — | 1 | 0.8 | 1.25 | 1.4 |

TABLE III

| Constituents | Grouts | | | | | |
|---|---|---|---|---|---|---|
| | 13 | 14 | 15 | 16 | 17 | 18 |
| Water (liters) | 1000 | 1000 | 1000 | 1000 | 1000 | 1000 |
| Clay (kg) | 45 | 35 | 40 | 50 | 30 | 42 |
| Cement (kg) | 250 | 250 | 250 | 250 | 250 | 250 |
| Siliceous product (kg) | 600 | 550 | 250 | 600 | 550 | 320 |
| Sodium carbonate (kg) | 25 | 24 | 25 | 26 | 26 | 25 |
| Sodium pyrophosphate (kg) | 5.5 | 6.5 | 5.5 | 5 | 4 | 6 |
| Potassium tartrate (kg) | 0.5 | 0.5 | 0.5 | 0.6 | 0.9 | 0.5 |

I claim:

1. Method of sealing off a mass of waste stored in the soil that consists of insulating the mass by establishing at least one grouting barrier or grouting curtain that retains heavy metallic cations and that is obtained by filling up hollows in the soil or fissured rock within the soil surrounding the mass with, or injecting into them, a grout containing
   60 to 500 parts by weight of cement,
   25 to 500 parts by weight of clay, and
   0 to 800 parts by weight of a natural or artificial siliceous product,
   per 1000 parts by weight of water, characterized in that the grout that is injected also contains a mixture of
   2 to 6 parts by weight of sodium carbonate and
   0.5 to 20 parts by weight of an alkali-metal pyrophosphate and/or alkali-metal tartrate
   to retain the heavy metallic cations.

2. Method as in claim 1, characterized in that the alkali-metal pyrophosphate is sodium pyrophosphate and the alkali-metal tartrate is potassium tartrate.

3. Method as in either of claims 1 and 2, characterized in that the grout contains 3 to 15 parts by weight of a mixture of sodium pyrophosphate and potassium tartrate, the ratio of pyrophosphate to tartrate generally ranging from 3:1 to 15:1.

4. Method as in claim 3, characterized in that the grout contains a siliceous product with at least 80 to 90% by weight of $Si_2$.

5. Method as in claim 4, characterized in that the siliceous product is natural or artificial pozzolans, fly ash, and/or silica fumes.

6. Method as in claim 5, characterized in that the siliceous product has a specific surface of more than 3000 $cm^2/g$.

7. Method as in claim 6, characterized in that the clay present in the grout is selected from the group consisting of bentonite, kaolin, montmorillonite, attapulgite, illite, and vermiculite.

8. Method as in claim 7, characterized in that the grout also contains between 5 and 50 parts by weight of at least one adjuvant, such as a hardening retardant of accelerator, per 1000 parts by weight of water.

* * * * *

UNITED STATES PATENT AND TRADEMARK OFFICE
CERTIFICATE OF CORRECTION

PATENT NO.   :   4,615,643
DATED        :   October 7, 1986
INVENTOR(S)  :   DANIEL GOUVENOT It is certified that error appears in the above—identified patent and that said Letters Patent is hereby corrected as shown below:

CLAIM 4, LINE 3, CHANGE "$Si_2$" TO —$SiO_2$—

Signed and Sealed this

Twenty-seventh Day of January, 1987

*Attest:*

DONALD J. QUIGG

*Attesting Officer*   *Commissioner of Patents and Trademarks*